United States Patent [19]
Toyoda et al.

[11] 4,213,926
[45] Jul. 22, 1980

[54] METHOD FOR MAKING A DECORATIVE PLATE USED IN A BUILDING

[75] Inventors: Minoru Toyoda, Kodaira; Tohei Horishima, Koganei; Kenji Sugimoto, Tokyo; Kensuke Aoyama, Sakato, all of Japan

[73] Assignees: Taisei Kensetsu Kabushiki Kaisha; Dai Nippon Printing Co., Ltd., both of Tokyo, Japan

[21] Appl. No.: 928,919

[22] Filed: Jul. 28, 1978

Related U.S. Application Data

[63] Continuation of Ser. No. 783,333, Mar. 31, 1977, abandoned.

[51] Int. Cl.² ............................................. B28B 7/36
[52] U.S. Cl. ............................................ 264/74; 156/232; 156/240; 264/129; 264/132; 264/134; 264/219; 264/245; 264/256; 264/338; 264/548; 427/149
[58] Field of Search .............. 264/245, 256, 338, 86, 264/132, 220, 74, 134, 219, 129; 427/133, 135, 146, 149; 156/230, 236, 232, 237, 240

[56] References Cited

U.S. PATENT DOCUMENTS

| 2,140,197 | 12/1938 | Batcheller | 156/230 X |
| 2,468,731 | 5/1949 | Borkland | 264/219 X |
| 3,206,527 | 9/1965 | Murray | 264/256 X |
| 3,703,572 | 11/1972 | Bellasalma | 264/220 X |

Primary Examiner—Thomas P. Pavelko
Attorney, Agent, or Firm—Birch, Stewart, Kolasch and Birch

[57] ABSTRACT

A method for making a decorative plate used in a building characterized by making a transfer sheet by applying a primer layer comprising a water-soluble binder to the surface of a synthetic resin sheet, printing a pattern comprising a coloring agent and a binder, at least one of which is water-soluble, on the primer layer, making a mold for a slip casting having the pattern layer on the inside surface by shaping the transfer sheet with the surface of the pattern layer upward, pouring a mixture comprising a hydraulic material and water into the mold, hardening the mixture, and stripping the synthetic resin sheet from the resulting decorative plate produced.

11 Claims, 15 Drawing Figures

METHOD FOR MAKING A DECORATIVE PLATE USED IN A BUILDING

This application is a continuation, of copending application Ser. No. 783,333, filed on Mar. 31, 1977 now abandoned.

The present invention relates to a method for making a decorative plate used in a building, and more particularly relates to a method for making a decorative plate used in a building having a pattern in which a coloring agent penetrates and unites with the surface of the plate.

Recently, various incombustible or difficultly combustible materials such as inorganic materials and inorganic-organic composite materials have been developed and provided. It has been carried out to decorate the surfaces of these materials to increase the effect of the decoration and consequently to raise the utility value of them. For the decoration of these materials, a simple heat transfer method, a direct printing method or a milling method have been used. However, a decoration itself is very difficult in the heat transfer method or a direct printing method. Even if a decoration is achieved the pattern is completely flat, for example, a richness and a significance which are present in a natural material are not obtained. In the milling method, there are disadvantages such that it is difficult to predict the finished decoration and/or reproduce the desired pattern. Therefore, these methods are not suitable for an industrial production and a sufficiently satisfactory method has not yet been found.

In order to overcome the above-mentioned difficulties and disadvantages of the prior art and to obtain a new method for making a decorative plate used in a building having a pattern in which a coloring agent penetrates the surface of the plate, the present inventors have made intensive and extensive studies.

As a result, it is recognized that when a pattern layer comprising a coloring agent and binder, at least one of which is water-soluble, is printed on one surface of a base support sheet to make a transfer sheet, and the transfer sheet is shaped with the surface of said pattern layer upward to form a mold for a slip casting having the pattern layer on the inside surface and a mixture comprising a hydraulic material and water is poured into the mold for a slip casting, that the coloring agent can penetrate into and unite with the surface of the hardened decorative plate. The decorative plate produced can be used for a building by stripping the base support sheet from the hardened decorative plate. When the base support sheet is a synthetic resin film or synthetic fiber paper, it is desirable to treat their surfaces with a primer at the point of printability. The present invention has been made, based on such novel finding.

Accordingly, it is an object of the present invention to provide a novel method for making a decorative plate used in a building having a pattern in which a coloring agent penetrates and unites with the surface of the plate.

It is another object of the present invention to provide a method for making a decorative plate of the above character, which is excellent in durability and which has same pattern and also a constant quality.

It is further object of the present invention to provide a method for making a decorative plate of the kind described above, which can be produced without heating and pressing.

It is a still further object of the present invention to provide a method of the character described above, which is simple in operation and can be carried out at a low cost.

Other objects and further scope of applicability of the present invention will become apparent from the detailed description given hereinafter; it should be understood, however, that the detailed description and accompanying specific examples, while indicating preferred embodiments of the invention, are given by way of illustration only, since various changes and modifications within the spirit and scope of the invention will become apparent to those skilled in the art from this detailed description. These changes and modifications are intended to be encompassed within the scope of this invention.

Namely, the present invention is a method for making a decorative plate used in a building characterized by making a transfer sheet by printing a pattern layer comprising a coloring agent and binder, at least one of which is water-soluble, on one surface of a base support sheet, making a mold for a slip casting having the pattern layer on the inside surface by shaping the transfer sheet with the surface of said pattern layer upward, pouring a mixture comprising a hydraulic material and water into the mold for a slip casting hardening the mixture and stripping said base support sheet from the decorative plate obtained.

As examples of the base support sheet of the transfer sheet which may be used in the present invention, it is preferable to use various papers, synthetic fiber papers and converted papers, synthetic resin films and sheets, metal foils such as aluminum foil and laminated films made of them. The thickness of said base support sheet is desireably less than 0.5 mm, particularly less than 0.2 mm in the point of printability. It is possible to use the laminate having a thickness of up to about 2 mm. Especially preferred are the synthetic fiber papers and synthetic resin films and sheets.

When the synthetic fiber paper or synthetic resin film is used as the base support sheet, it is desirable to treat them with a primer in the point of printability. In this primer treatment, a material selected from the water soluble binder described hereinafter may be printed on the surface of the base support sheet in an amount of 1 to 10 g/m² (dry).

As the coloring agent, a dye and/or pigment can be used.

As examples of the dye, there are mentioned direct dyes, acid dyes, basic dyes, acid mordant dyes, reactive dyes and disperse dyes. For example, Chrysamine G (C.I.22250)*, Alizarine Yellow 5GS (C.I.14055)* , Alizarine Sky Blue B (C.I.62105)**, Palatin Chrome Red RX (C.I.22275)*, Anthraquinone Violet (C.I.61710 and 61800), Alizarine Saphirol B (C.I.63010), Alizarine Rubinol R (C.I.68215) and Methylene Blue (C.I.52015) can be used. [*=water-soluble: **=water-insoluble]

As the pigment, an inorganic pigment and/or organic pigment can be used.

As examples of the inorganic pigment, there are mentioned precipitated calcium carbonate (C.I.77220), china clay (C.I.77005), talc (C.I.77718), titanium dioxide (C.I.77891), carbon black (C.I.77265), precipitated barium sulfate (C.I.77120), chrome yellow (C.I.77600), cadmium yellow (C.I.77199), chrome vermilion (C.I.77605), cadmium red (C.I.77202), prussian blue (C.I.77510 and 77520), ultramarine (C.I.77007), iron oxide (C.I.77491) and aluminum white (C.I.77002). [These are water-insoluble.]

As examples of the organic pigment, there are mentioned azo pigments such as Lake Red 4R (C.I.12120)**, Fast Yellow G (C.I.13015 and 4000)* and Benzidine Yellow G (C.I.21090); azo lake pigments such as Lake Red C (C.I.15585)*, Lake Red D (C.I.15560)*, Brilliant Scarlet G (C.I.15800) and Brilliant Carmine 6B (C.I.15850)**; phthalocyanine pigments such as Phthalocyanine Blue (C.I.74160) and Phthalocyanine Green (C.I.74260); threne pigments such as Indanthrene Violet RH (C.I.73385), Indanthrene Direct Black B (C.I.65230), Indanthrene Brilliant Orange GR (C.I.71105), Indanthrene Brown BR (C.I.70800), Indanthrene Scarlet RB (C.I.71135), Indanthrene Orange RRT (C.I.59705), Indanthrene Orange RRTP (C.I.59705) and Alizarine Lake (C.I.58000); quinacridone pigments such as Cinquasia Red (C.I.46500); dioxazine pigments such as PV Fast Violet BL (C.I.51319); azo chelete pigments such as Green Gold (C.I.12775); dye type pigments, for example acidic dye lakes such as Quinoline Yellow (C.I.47055)*, basic dye lakes such as Auramine Lake Yellow O (C.I.41000)* and nitro pigments such as Naphtol Yellow S (C.I.10316)*. Moreover, other organic pigments such as mordant dye pigments, vat dye pigments and nitroso pigments may be mentioned. [*=water-soluble; =water-insoluble; *=slightly water-soluble; ****=soluble in hot water]

As examples of the binder, there are mentioned dextrin*, glue*, casein, shellac, gum arabic*, starch, protein, polyvinyl alcohol*, polyacrylic acid amide*, sodium polyacrylate*, polyvinyl ether*, copolymer* of methyl vinyl ether and maleic anhydride, copolymer* of vinyl acetate and itaconic acid, polyvinyl pyrrolidone*, cellulose, acetyl cellulose, acetyl butyl cellulose, nitrocellulose, ethycellulose**, carboxymethylcellulose*, methylcellulose*, hydroxyethyl cellulose* and hydroxymethylcellulose. [*=water-soluble; **=water-insoluble]

Furthermore, in addition to the coloring agent and binder at least one of which is water-soluble, the above-mentioned pattern layer may comprise well-known additives such as various plasticizers, wax, grease, vaseline, drier, auxiliary drier, surface active agent and filler.

The pattern layer which constitutes the transfer sheet can be provided on one surface of a base support sheet by preparing an ink composition by mixing and kneading a coloring agent and binder, at least one of which is water-soluble, and if necessary various well-known additives with a solvent or diluent and by printing or drawing the obtained ink composition on one surface of the base support sheet with a normal printing method, for example a gravure-, dry offset-, relief- and silk-screen-printings or a normal drawing method to form a single or multiple color pattern.

A method for making a decorative plate used in a building using the transfer sheet obtained above according to the present invention is illustrated by the following detailed description taking in connection with the accompanying drawings which are given by way of illustration only, and thus are not limitative of the present invention, in which:

Figure 1:
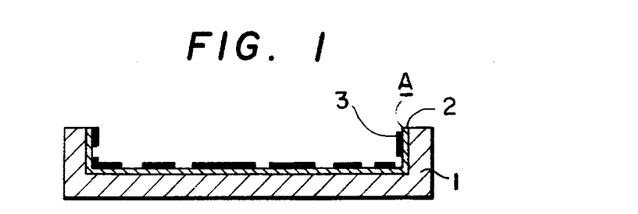
FIGS. 1 to 4 show a sectional view of steps of one mode of the method of the present invention.
Figure 2:
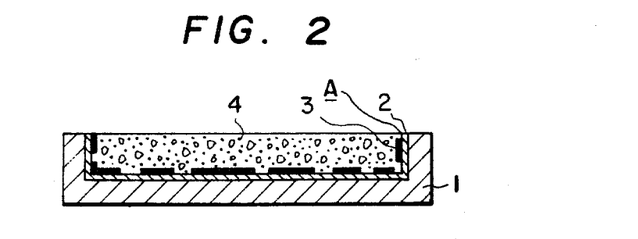
Figure 3:
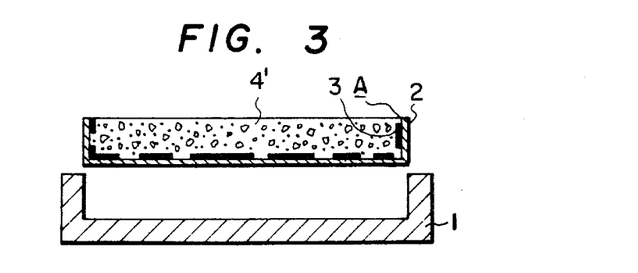
Figure 4:
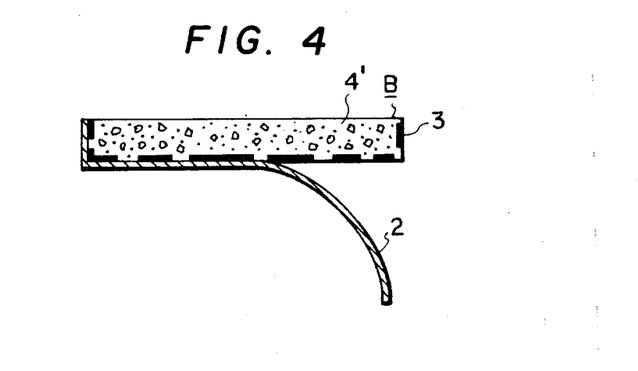

As shown in FIG. 1, the first step of one mode of the method of the present invention is a step of laying a transfer sheet A on the inside surface of a forming frame 1. The transfer sheet A has a suitable pattern layer 3 on one surface of a base support sheet 2. In the laying of the transfer sheet A in the first step, it is necessary to so set the surface not having pattern layer 3 of the transfer sheet A so as to contact the inside surface of the forming frame 1. Then, as shown in FIG. 2, the second step of the method of the present invention is a step of pouring a predetermined quantity of a mixture 4 comprising a hydraulic material and water into the forming frame 1 having had the transfer sheet A laid on the inside surface thereof and allowing said mixture to harden. Then, as shown in FIG. 3, the third step of the method of the present invention is a step of removing from the forming frame 1 a hardened plate 4' made integral with the transfer sheet A as a result of the hardening of the mixture 4 comprising hydraulic material and water. Further, as shown in FIG. 4, the fourth step of the method of the present invention is a step of stripping the base support sheet 2 of the transfer sheet A made integral with the hardened plate 4'. An objective decorative plate B used in a building is obtained by the above final step.

Figure 5:
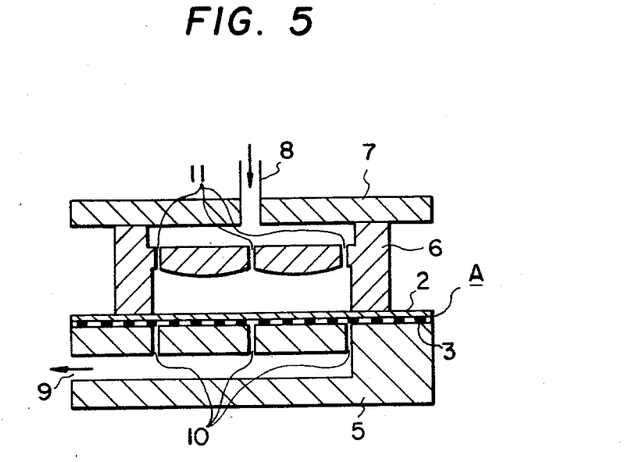
FIGS. 5 to 11 show a sectional view of steps of another mode of the method of the present invention.
Figure 6:
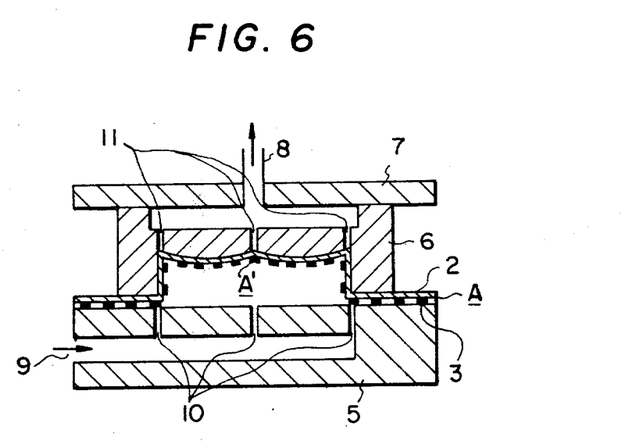
Figure 7:
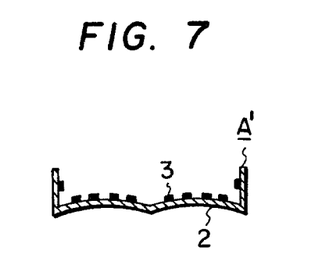

As shown in FIG. 5, the first step of another mode of the method of the present invention is a step of laying a transfer sheet A on a heating plate 5 so as to contact a pattern layer 3 of the transfer sheet A with the heating plate 5 and then placing a forming die 6 onto the pattern layer 3 and thereafter applying a pressing plate 7 on the forming die 6. By introducing air under pressure into the inside of the die 6 through holes 11 from an air passing tube 8 in the direction of the arrow, the transfer sheet A is heated on the heating plate 5 in a close contact state. As shown in FIG. 6, when temperature of the transfer sheet A reaches to a suitable forming temperature, air is conversely introduced under pressure from the air introducing opening 9 and is then passed through holes 10 to pressure-form the transfer sheet A in contact with the forming die 6. When the temperature of the thus obtained molding A' reaches to a normal temperature, the introduction of air is stopped and the molding A' is removed from the forming die 6 by the lifting of the latter and the excess portion of the molding is cut to obtain a mold for slip casting A' which is formed from the transfer sheet A, as shown in FIG. 7. In FIG. 7, A' shows the mold for slip casting, 2 shows the base support sheet and 3 shows the pattern layer.

Figure 8:
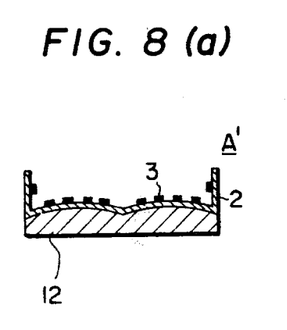

Then, the mold for slip casting A' thus obtained is laid on a supporting block 12 as shown in FIG. 8(a). When the bottom of the mold for slip casting is flat, or when the mold for slip casting is not transformed by pouring a mixture comprising a hydraulic material and water, even if the bottom of it is not flat, the supporting block may be flat but it is preferable to use a supporting block having same or substantially same shape as the shape of the bottom of the mold for slip casting A' as shown in FIG. 8(b).

When the side wall of the mold for slip casting is necessary to be reinforced, it is possible to use the supporting block 12' having the side wall as shown in FIG. 8(b). Furthermore, the material of the supporting block 12 or 12' may be anyone of materials having a strength for supporting.

Figure 9:
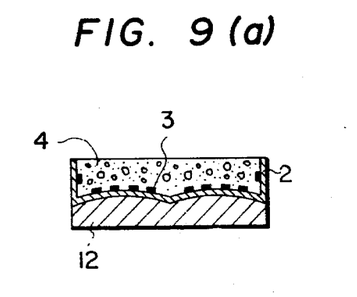

As shown in FIG. 9(a), then, a mixture 4 comprising a hydraulic material and water is poured into the mold for slip casting A' which is laid on the support block 12.

Figure 10A:
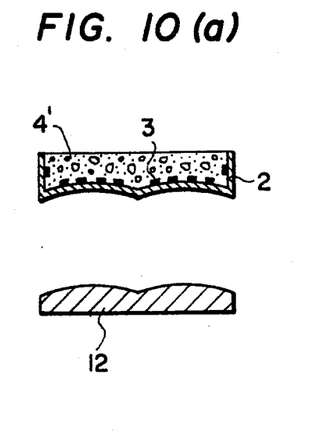

As shown in FIG. 10(a), the mixture 4 of FIG. 9(a) comprising hydraulic material and water thus poured is hardened and simultaneously the pattern layer 3 of the transfer sheet which constitutes the mold for slip casting A' penetrates and unites with the hardened plate 4'. The hardened plate 4' is removed from the supporting block 12.

Figure 10B:
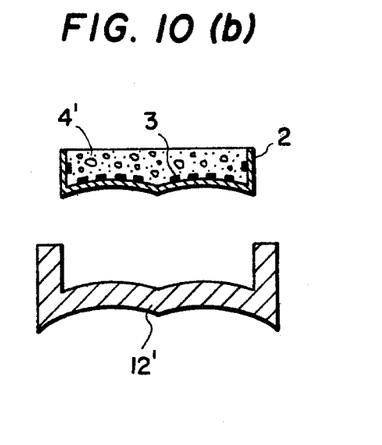

In FIG. 9(b) and 10(b), only the shape of the supporting blocks 12' are different from those of FIG. 9(a) and 10(a) and consequently both of the operations are the same.

Figure 11:
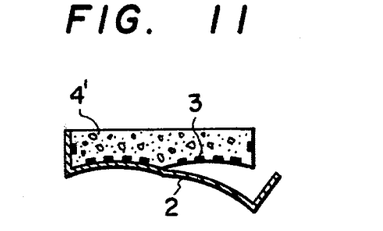

As shown in FIG. 11, the base support sheet 2 of the transfer sheet is stripped from the hardened plate 4' to obtain a decorative plate B used in a building.

Figure 12:
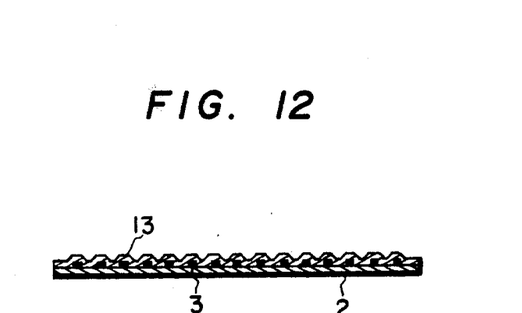
FIG. 12 shows a sectional view of a further type of transfer sheet which is used in the method of the present invention.

As shown in FIG. 12, furthermore, if a protective film 13 comprising a water-soluble substance selected from the beforementioned binders is provided on the whole surface of the pattern layer 3 of the transfer sheet A, a collapse of the pattern can be inhibited, because it is difficult to disturb the pattern layer when the hydraulic material is slip-casted. The speed for the penetration of the mixture comprising hydraulic material and water by the pattern layer can be suitably controlled according to the degree of water solubility of substance which is used for the forming of the protective film 13 and to the thickness of said protective film [1~10 g/m² (dry state)]. By such control, the transfer sheet can be sufficiently united with the hardened plate and consequently the transfer-printability of the pattern can be increased.

The forming of the above protective film can be effected by an ordinary coating method such as roll coating, gravure coating and bar coating with a composition which contains said water-soluble binder and solvent or diluent.

As the hydraulic material which may be used in the method of the present invention, it is possible to use one having a fluidity which is able to effect a slip casting, and having a hydraulic property.

As examples of the hydraulic material which may be used in the method of the present invention, there are mentioned various gypsums such as hemihydrate gypsum and anhydrous gypsum and various cements such as portland cement, aluminous cement, magnesia cement and mixed cement. These hydraulic materials can be used in a form of slurry comprising one or more of these hydraulic material and water. It is preferable to add pulp, synthetic fiber, glass fiber, metal fiber, carbon fiber, synthetic resin fiber and synthetic resin as such to the slurry in order to reinforce a resultant product. Furthermore, one or more of various additives such as asbestos fiber, nylon fiber, polypropylene fiber, alkali-resistant glass fiber, polyester fiber and steel fiber can be added to the slurry.

By adding an amino resin to the slurry not only are the luster and hardness of the surface of the product enhanced but also it is possible to obtain a very desirable effect which prevents the destruction of the pattern layer on the transfer sheet when a slip casting is carried out. This effect for inhibiting the destruction of the pattern layer, which is obtained by the addition of amino resin to the slurry, is considerably superior to the effect which is obtained by no addition of amino resin or which is obtained by addition of other resins.

Also the decorative plate used in a building which is obtained by the method of the present invention can be sufficiently used in that state; however, various characteristics such as life, luster and design can be improved by an after-treatment as described hereinafter.

For example, the decorative plate used in a building as described above can be coated with a transparent resin layer by ordinary coating method such as a roll coating, gravure coating, bar coating and spray coating. As examples of the resins, there are mentioned urethane resin, vinyl chloride resin, vinylidene chloride resin, vinyl acetate resin, polyolefinic resins such as polyethylene and polypropylene, polystyrene resin, acrylic resin, methacrylic resin, polyvinyl alcohol, polyacetal, copolymer of styrene and acrylonitrile, acrylonitrile-butadinestyrene resin, polyamide resin, unsaturated polyester resin, epoxy resin, phenol resin and amino resin.

When the hardened plate as the decorative plate is obtained from a material such as gypsum which becomes porous as self-hardening occurs, the hardened plate is impregnated with a monomer or prepolymer, and then the impregnated monomer or prepolymer is polymerized and finally dried, or the hardened plate is impregnated with a solution of polymer in a solvent and then dried. By such procedure, the strength of the hardened plate is increased and simultaneously the pattern layer which penetrated into and united with the surface of the plate can further penetrate into porous portions of the plate. Consequently, the pattern layer having further richness and significance can be achieved. After this after-treatment, the after-treated surface of the hardened plate can be similarly coated with a transparent layer as described above.

As the examples of the above monomer, there are mentioned monomers of styrene and its derivatives, vinylidence chloride, vinyl pyridine, unsaturated carboxylic acids such as acrylic acid, methacrylic acid, itaconic acid, maleic acid and fumaric acid, and ester derivatives such as methyl-, ethyl-, propyl- and butyl-esters of these acids, nitrile derivatives of these acids, acid amide derivatives of these acids, hydroxyethylacrylate and methacrylate, hydroxypropylacrylate and methacrylate, vinyl acetate, allyl alcohol and allyl ester, methylvinylketone, acrolein and vinyl carbazole.

As examples of the prepolymer, there are mentioned a prepolymer of methyl methacrylate, a primary condensate of phenol-formaldehyde, a primary condensate of melamineformaldehyde, a primary condensate of unsaturated polyester, a primary condensate of ketone-aldehyde, a primary condensate of epoxy resin and a primary condensate of diallyl phthalate polymer.

As examples of the polymer, a homopolymer of one of the above-mentioned monomers and a copolymer of two or more of the above-mentioned monomers can be used. Namely, the resins which may be used for the formation of the above transparent resin layer can be used as the polymer.

One or more of the above monomers, prepolymers or polymers is respectively used. When the monomer or prepolymer is used a catalyst or promotor which is necessary to polymerize the monomer or prepolymer can be added.

As examples of the catalyst and promotor, there are mentioned peroxide, azo compound and disulfide. The addition quantity of the catalyst or promotor is preferably about 0.5 to 1% by weight based upon the weight of the monomer or prepolymer.

When the above monomer or prepolymer is liquid, the surface of the hardened plate decorated with a pattern layer is coated and impregnated with the monomer or prepolymer itself. When the monomer or prepolymer is not liquid it is dissolved in a solvent to form a solution and then the solution is used for the coating and impregnating of the hardened plate decorated with a pattern layer. Even if the monomer or prepolymer is liquid, it may be dissolved in a solvent to form a solution which is subsequently used for the coating and impregnating of the hardened plate decorated with a pattern layer. Of course, the polymer must be used in the form of solution of it in a solvent. The above solvent can be selected from those which can dissolve the above monomers, prepolymers or polymers. As examples of the solvent, there are mentioned ketones, esters, aromatics, halogenated hydrocarbons, dimethylformamide and tetrahydrofuran. When the monomer or prepolymer is coated on the surface of the hardened plate decorated with a pattern layer, the surface of the hardened plate is heated to polymerize the monomer or prepolymer.

Since at least one of the coloring agent and binder which constitute the pattern layer of the transfer plate is water-soluble, the mixture comprising hydraulic material and water penetrates into the pattern layer and is hardened and consequently the hardened hydraulic material is united with the pattern layer.

In the decorative plate used in a building which is obtained by the method of the present invention, therefore, the richness and the significance of the product is present and the massiveness and weightiness of the product is not lost, because the pattern penetrates and unites with the surface layer of the hardened plate. And also, the pattern is penetrates and unites with the surface layer of the hardened plate, the pattern layer is difficult to peel off from the hardened plate and further when the before-mentioned aftertreatment is applied it is possible to increase the durability of the obtained decorative plate.

According to the method of the present invention, the pattern layer can be transferred to the hardened plate by a capillary action of the water which is contained in the hydraulic material without any heating and pressurizing so that a decorative plate used in a building can be easily manufactured. In the method of the present invention, also, the reproducibility of the pattern is very good and optionally uniform and a stable pattern can be obtained so that this method is suitable for industrial mass production.

The decorative plate used in a building which is manufactured by the method of the present invention has a wide variety of used, for example as a material for a ceiling, a floor, a wall and/or an interior decoration of a building.

In order that the present invention may be well understood, the following examples are given by way of illustration only. Unless otherwise stated, quantities are expressed as parts by weight.

EXAMPLE 1

The transfer sheet (I) was made by printing on one side surface of a synthetic fiber paper with a marble pattern by a gravure printing method using A, B and C inks having respectively the following composition:

| A ink | |
|---|---|
| Mikcton Polyester Yellow 5G (C.I. 12790) | 18 parts |
| Polyvinyl pyrrolidone | 5 parts |
| Polyvinyl alcohol | 4 parts |
| Ethyl alcohol | 15 parts |
| Water | 58 parts |
| B ink | |
| Celliton Pink FF3B(C.I.62015) | 18 parts |
| Polyvinyl pyrrolidone | 5 parts |
| Polyvinyl alcohol | 4 parts |
| Ethyl alcohol | 15 parts |
| Water | 58 parts |
| C ink | |
| Sumikaron Blue SBG(C.I.63305) | 18 parts |
| Polyvinyl pyrrolidone | 5 parts |
| Polyvinyl alcohol | 4 parts |
| Ethyl alcohol | 15 parts |
| Water | 58 parts |

Then the surface having no pattern layer of the transfer sheet (I) was set so as to contact the inside of a forming frame, and a mixture of 100 parts of gypsum and 37 parts of water was poured into the forming frame having had the transfer sheet (I) laid on the inside surface thereon and the mixture was naturally made to harden. Then the hardened plate with the transfer sheet (I) was removed from the forming frame and the base support sheet of the transfer sheet was stripped from the hardened plate to obtain a decorative gypsum plate. In this decorative gypsum plate, the pattern penetrated into and united with the surface layer of the hardened plate and as a result the product has a superior richness.

Furthermore, the decorative gypsum plate was coated and impregnated with the prepolymer which was obtained by reacting 100 parts of monomer of methyl methacrylate with 0.5 parts of benzoyl peroxide at the temperature of 80° C. for 30 minuites. The hardening and annealing of the coating was completed by maintaining the decorative gypsum plate at the temperature of 95° C. for 3 hours. By this operation, the richness of the pattern was further increased, the stable color tone was obtained and the durability of the pattern was increased.

EXAMPLE 2

An abstract pattern was printed on a woodfree paper which was laminated with a polyethylene film by a gravure printing method using A, B and C inks having respectively the following composition:

| A ink | |
|---|---|
| Permanent Yellow HR (C.I. Pigment Yellow 83) | 18 parts |
| Polyvinyl pyrrolidone | 5 parts |
| Polyvinyl alcohol | 4 parts |
| Ethyl alcohol | 15 parts |
| Water | 58 parts |
| B ink | |
| PV Carmine HF4C (C.I. Pigment Red 185) | 18 parts |
| Polyvinyl pyrrolidone | 5 parts |
| Polyvinyl alcohol | 4 parts |
| Ethyl alcohol | 15 parts |
| Water | 58 parts |
| C ink | |
| Mikethrene Blue RSN(C.I.69800) | 18 parts |
| Polyvinyl pyrrolidone | 5 parts |
| Polyvinyl alcohol | 4 parts |
| Ethyl alcohol | 15 parts |
| Water | 58 parts |

The mixture consisting of 30 parts of a mixture of maleic acid having a high acid value and carboxy methyl cellulose, 20 parts of ethyl alcohol and 50 parts of water was gravure-coated on the above whole printed surface and dried to obtain the transfer sheet (II).

Then the surface having no pattern layer of the transfer sheet (II) was set so as to contact the inside of the forming frame having a size of 8 mm (thickness)×303 mm (length)×303 mm (width), and a mixture of 100 parts of gypsum, 20 parts of acrylic emulsion and 35 parts of water was poured into the forming frame having had the transfer sheet (II) laid on the paper side surface thereon and the mixture was naturally made to harden. Then the hardened plate with the transfer sheet (II) was removed from the forming frame and the base support sheet of the transfer sheet was stripped from the hardened plate to obtain a decorative gypsum-plastic complex tile-like product. This product was similarly superior as described in Example 1.

Furthermore, the surface of the decorative gypsum-plastic complex tile-like product was coated with a lacque of acrylurethane type by the dipping. By this procedure the durability and the sense of beauty of the pattern were increased.

EXAMPLE 3

The transfer sheet (III) was made by printing an abstract pattern on a polyvinyl chloride film by using the same method as described in Example 2.

Then the transfer sheet (III) was vacuum-formed in a position at which the pattern of the transfer sheet (III) was maintained in an inner side to obtain the mold for a slip casting having the same size as that of the forming frame used in Example 2.

The mold for a slip casting is laid in the above forming frame used in Example 2.

By carrying out the pouring of the hydraulic material into the mold, the removal of the hardened plate from the forming frame and the stripping of the base support sheet, a decorative gypsum-plastic complex tile like product was obtained. This product is similarly superior as described in Example 1.

EXAMPLE 4

Example 3 was repeated except that a mixture of 100 parts of white cement, 300 parts of white siliceous sand, 60 parts of water and 0.5 parts of water-reducing agent (alkyl-aryl sulfonate) is used as the hydraulic material.

By carrying out such method as described in Example 3, thereafter, a decorative cement tile like product was obtained.

In the product, the pattern penetrated into and united with the surface layer of the decorative plate and the richness of the product was found.

EXAMPLES 5 to 9

A marble pattern was printed on one side surface of synthetic fiber paper by a gravure printing method using a respective ink composition which was shown in the following Table 1 to obtain the transfer sheets (IV), (V), (VI), (VII) and (VIII).

Table 1

| Example | Ink | Composition | | Transfer sheet |
|---|---|---|---|---|
| 5 | A | Permanent Yellow G(C.I.11680) | 5 parts | |
| | | Polyvinyl alcohol | 3 parts | |
| | | Polyvinyl pyrrolidone | 3 parts | |
| | | Ethyl alcohol | 45 parts | |
| | | Water | 44 parts | |
| | B | Permanent Red FRL(C.I.12440) | 5 parts | |
| | | Polyvinyl alcohol | 3 parts | |
| | | Polyvinyl pyrrolidone | 3 parts | IV |
| | | Ethyl alcohol | 45 parts | |
| | | Water | 44 parts | |
| | C | Mikethrene Blue 3G(C.I.69840) | 5 parts | |
| | | Polyvinyl alcohol | 3 parts | |
| | | Polyvinyl pyrrolidone | 3 parts | |
| | | Ethyl alcohol | 45 parts | |
| | | Water | 44 parts | |
| 6 | A | Mikethrene Yellow 3RT(C.I.70805) | 5 parts | |
| | | Hydroxypropyl cellulose | 10 parts | |
| | | Polyvinyl alcohol | 10 parts | |
| | | Water | 75 parts | |
| | B | Perylene Red light(C.I.71145) | 5 parts | |
| | | Hydroxypropyl cellulose | 10 parts | |
| | | Polyvinyl alcohol | 10 parts | V |
| | | Water | 75 parts | |
| | C | Indanthrene Blue RS(C.I.69800) | 5 parts | |
| | | Hydroxypropyl cellulose | 10 parts | |
| | | Polyvinyl alcohol | 10 parts | |
| | | Water | 75 parts | |
| 7 | A | Mikethrene Yellow GK(C.I.61725) | 10 parts | |
| | | Water-soluble acrylic resin | 15 parts | |
| | | Ethyl alcohol | 50 parts | |
| | | Water | 25 parts | |
| | B | Mikethrene Red FBB(C.I.67000) | 10 parts | |
| | | Water-soluble acrylic resin | 15 parts | |
| | | Ethyl alcohol | 50 parts | VI |
| | | Water | 25 parts | |
| | C | Cyanine Blue BB(C.I.74160) | 10 parts | |
| | | Water-soluble acrylic resin | 15 parts | |
| | | Ethyl alcohol | 50 parts | |
| | | Water | 25 parts | |
| | A | Orasol Yellow GRLN(C.I.18690) | 10 parts | |
| | | Hydroxymethyl cellulose | 10 parts | |
| | | Ethyl alcohol | 40 parts | |

Table 1-continued

| Example | Ink | Composition | | Transfer sheet |
|---|---|---|---|---|
| | | Water | 40 parts | |
| | | Neozapon Red BE(C.I.12716) | 10 parts | |
| | | Hydroxymethyl cellulose | 10 parts | |
| 8 | B | Ethyl alcohol | 40 parts | VII |
| | | Water | 40 parts | |
| | | Orasol Blue BLW(C.I.50315) | 10 parts | |
| | | Hydroxymethyl cellulose | 10 parts | |
| | C | Ethyl alcohol | 40 parts | |
| | | Water | 40 parts | |
| | | Neozapon Yellow R(C.I.18690) | 15 parts | |
| | | Vinyl acetate-vinylpyrrolidone copolymer | 15 parts | |
| | A | Ethyl alcohol | 60 parts | |
| | | Water | 10 parts | |
| | | Oil Scarlet G(C.I.26100) | 15 parts | |
| | | Vinyl acetate-vinylpyrrolidone copolymer | 15 parts | |
| 9 | B | Ethyl alcohol | 60 parts | VIII |
| | | Water | 10 parts | |
| | | Orasol Blue BLW(C.I.50315) | 15 parts | |
| | | Vinyl acetate-vinylpyrrolidone copolymer | 15 parts | |
| | C | Ethyl alcohol | 60 parts | |
| | | Water | 10 parts | |

By carrying out such method as described in Example 1, thereafter, decorative gypsum plates were obtained. In these products, the respective pattern penetrated into and united with the surface layer of the decorative plate and the richness of these products were found.

EXAMPLE 10

Example 3 was repeated except that a slurry obtained by agitating 100 parts of white cement, 15 parts of siliceous cement, 40 parts of water, 8 parts of anti-alkali glass and 1 parts of water-reducing agent (alkyl-aryl sulfonate) was used. As a result, a panel which has an ultra thin thickness of 3.2 mm and 90 cm square and was decorated with an abstract picture was obtained. This panel was applicable for prior precast concrete plate having a thickness of 150 to 180 mm.

EXAMPLE 11

The inner surface of a forming frame for a centrifugal casting of Hume concrete tube was lined with the beforementioned transfer sheet (II). The mixing of concrete was carried out as shown in the following Table 2 using a counter-current high-speed mixer.

Table 2

| White cement (kg/m³) | Sand (kg/m³) | Gravel (kg/m³) | S/A (%) | W/C (%) | Admixture M-150 | Slump (cm) |
|---|---|---|---|---|---|---|
| 410 | 778 | 1080 | 43 | 36 | C × 1% | 5 ~ 8 |

The mixture was poured into said forming frame for a centrifugal casting which was lined with the transfer sheet (II) and then the centrifugal casting was effected. By this process, a decorative concrete pipe having a ring-like pattern in a rotating direction was obtained according to the pattern which was printed on the transfer sheet lined on the inner surface of the forming frame.

The cylindrical decorative product which was obtained by this method was used a smoking stand and illumination lamp.

EXAMPLE 12

The transfer sheet (IX) was made by primer-treating the film of opal polyvinyl chloride having the thickness of 0.2 mm with a solution of 15 parts of hydroxypropyl cellulose and 85 parts of ethyl alcohol and by printing the film with a marble pattern by a gravure printing method using A, B and C inks having respectively the following composition:

| A ink | | |
|---|---|---|
| | Permanent Yellow HR (C.I.Pigment Yellow 83) | 10 parts |
| | Polyvinyl alcohol | 5 parts |
| | Polyvinyl pyrrolidone | 3 parts |
| | Ethyl alcohol | 42 parts |
| | Water | 40 parts |
| B ink | | |
| | PV Carmine HF4C (C.I.Pigment Red 185) | 10 parts |
| | Polyvinyl alcohol | 5 parts |
| | Polyvinyl pyrrolidone | 3 parts |
| | Ethyl alcohol | 42 parts |
| | Water | 40 parts |
| C ink | | |
| | Mikethrene Blue RSN(C.I.69800) | 10 parts |
| | Polyvinyl alcohol | 5 parts |
| | Polyvinyl pyrrolidone | 3 parts |
| | Ethyl alcohol | 42 parts |
| | Water | 40 parts |

In the apparatus as shown in FIGS. 5 and 6, the heating plate was heated at the temperature of 110° C. for 4 seconds, the transfer sheet (IX) was press-formed on the forming die under the air pressure of 5 kg/cm², the formed transfer sheet was cooled, removed from the forming die and trimmed to make the mold for slip casting having the size of 9 mm (thickness)×200 mm (length)×200 mm (width).

Furthermore, said mold for slip casting was laid on the supporting block as shown in FIGS. 8(a) and then the slurry consisting of 100 parts of gypsum, 40 parts of water, 0.3 parts of glass fiber and 2 parts of urea resin was poured into the mold for a slip casting and was sufficiently hardened. Then the hardened plate was removed from the supporting block and the base support sheet was stripped to obtain a decorative gypsum tile plate.

The invention being thus described, it will be obvious that the same may be varied in many ways. Such variations are not to be regarded as a departure from the spirit and scope of the invention, and all such modifications as would be obvious to one skilled in the art are intended to be included within the cope of the following claims.

What we claim is:

1. A process for making a decorative plate used in a building consisting essentially of the steps of:
   (a) Preparing a transfer sheet by applying a primer layer comprising a water-soluble binder in an amount of 1 to 10 grams/m² (dry) on the surface of a synthetic resin sheet less than 0.5 mm thick and printing a pattern layer comprising a coloring agent and a binder at least one of which is water-soluble, on said primer layer;
   (b) Making a mold for a slip casting wherein the pattern layer is on the inside surface of said mold by shaping the transfer sheet such that the surface of said pattern layer faces upward;
   (c) Pouring a mixture comprising a hydraulic material and water into the mold for slip casting;
   (d) Hardening said mixture; and
   (e) Stripping said synthetic resin sheet from the resulting hardened configuration to produce said decorative plate.

2. The process as disclosed in claim 1, wherein said hydraulic material mixture further contains an amino resin.

3. The process as disclosed in claim 1, further including the step of coating a transparent resin layer on the surface of the resulting plate decorated with the pattern layer.

4. The process as disclosed in claim 3, wherein said resin layer comprises a resin selected from at least one member of the group consisting of a urethane resin, vinyl chloride resin, vinylidene resin, polyethylene resin, polypropylene resin, polystyrene resin, acrylic resin, methacrylic resin, polyvinyl alcohol, polyvinyl acetyl, copolymer of styrene and acrolonitrile, acrylonitrile-butadiene-styrene resin, polyamide resin, unsaturated polyester resin, epoxy resin, phenol resin, and an amino resin in a solvent.

5. The process as disclosed in claim 1, further including the steps of impregnating the resulting decorative plate with a polymer solution and drying said impregnated plate.

6. The process as disclosed in claim 5, wherein said solution comprises at least one member selected from the group consisting of a urethane resin, vinyl chloride resin, vinylidene chloride resin, polyethylene resin, polypropylene resin, polystyrene resin, acrylic resin, methacrylic resin, polyvinyl alcohol, polyvinyl acetyl, copolymer of styrene and acrylonitrile, acrylonitrile-butadiene-styrene resin, polyamide resin, unsaturated polyester resin, epoxy resin, phenol resin, and an amino resin in a solvent.

7. A process for making a decorative plate used in a building consisting essentially of the steps of:
   (a) preparing a transfer sheet by applying a primer layer comprising a water-soluble binder in an amount of 1–10 grams/m² (dry) on the surface of a synthetic resin sheet less than 0.5 mm thick, and printing a pattern layer comprising a coloring agent and a binder, at least one of which is water-soluble, on said primer layer;
   (b) forming a protective film of a water-soluble binder on the surface of said transfer sheet having the pattern layer thereon;
   (c) forming a mold from said transfer sheet for a slip casting wherein the pattern layer is on the inside surface of said mold by shaping the transfer sheet such that the surface of said pattern layer faces upward;
   (d) pouring a mixture comprising a hydraulic material and water into said mold for slip casting;
   (e) hardening said mixture; and
   (f) stripping said synthetic resin sheet from the resulting hardened configuration to produce said decorative plate.

8. The process as disclosed in claim 1, wherein said primer is applied to said transfer sheet at the point of applicability of said pattern layer.

9. A process for making a decorative plate used in a building, consisting essentially of the steps of:
   (a) preparing a transfer sheet by primer treating a film of opal polyvinyl chloride having a thickness of 0.2 mm with a solution of 15 parts of hydroxypropyl cellulose and 85 parts of ethyl alcohol and printing the film with a marble pattern by a gravure printing technique using inks A, B and C having the following composition:

| A ink | | |
|---|---|---|
| | Permanent Yellow HR | |
| | (C.I.Pigment Yellow 83) | 10 parts |
| | Polyvinyl alcohol | 5 parts |
| | Polyvinyl pyrrolidone | 3 parts |
| | Ethyl alcohol | 42 parts |
| | Water | 40 parts |
| B ink | | |
| | PV Carmine HF4C | |
| | (C.I.Pigment Red 185) | 10 parts |
| | Polyvinyl alcohol | 5 parts |
| | Polyvinyl pyrrolidone | 3 parts |
| | Ethyl alcohol | 42 parts |
| | Water | 40 parts |
| C ink | | |
| | Mikethrene Blue RSN(C.I.69800) | 10 parts |
| | Polyvinyl alcohol | 5 parts |
| | Polyvinyl pyrrolidone | 3 parts |
| | Ethyl alcohol | 42 parts |
| | Water | 40 parts |

(b) preparing a mold for a slip casting wherein the pattern layer is on the inside surface of said mold by laying the above said transfer sheet on a heating plate so as to contact the pattern layer of said transfer sheet with said heating plate, said plate being heated at a temperature of 100° C. for 4 seconds, shaping said transfer sheet such that the surface of said pattern layer faces upward by pressure forming said transfer sheet on a forming die under air pressure of 5 kg/cm², cooling the resulting formed transfer sheet and removing said formed transfer sheet from the forming die to provide the mold for slip casting having the size of 9 mm thickness×200 mm length×200 mm width,
   (c) pouring a slurry consisting of 100 parts of gypsum, 40 parts of water, 0.3 parts of glass fiber and 2 parts of urea resin into the mold,
   (d) hardening said slurry and
   (e) stripping said transfer sheet from the resulting hardened configuration to produce a decorative gypsum tile plate.

10. The process as disclosed in claim 6, wherein said hydraulic material mixture comprises an amino resin.

11. The process as disclosed in claim 7, wherein said hydraulic material mixture comprises an amino resin.

* * * * *